US006832290B2

(12) United States Patent
Todd

(10) Patent No.: US 6,832,290 B2
(45) Date of Patent: Dec. 14, 2004

(54) METHOD, SYSTEM, PROGRAM, AND DATA STRUCTURES FOR MAINTAINING METADATA IN A STORAGE SYSTEM

(75) Inventor: Kenneth Wayne Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 10/096,400

(22) Filed: Mar. 12, 2002

(65) Prior Publication Data

US 2003/0177130 A1 Sep. 18, 2003

(51) Int. Cl.[7] .............................................. G06F 12/00
(52) U.S. Cl. ...................................................... 711/113
(58) Field of Search ................................ 711/112, 113; 707/200

(56) References Cited

U.S. PATENT DOCUMENTS 5,155,845 A    10/1992  Beal et al.
5,283,884 A    2/1994   Menon et al.
5,535,372 A  * 7/1996   Benhase et al. .............. 703/23
5,694,570 A    12/1997  Beardsley et al.
6,041,386 A    3/2000   Bello \* cited by examiner

*Primary Examiner*—Kevin L. Ellis
(74) *Attorney, Agent, or Firm*—David W. Victor; Konrad Raynes & Victor LLP

(57) ABSTRACT

Provided are a method, system, program, and data structure for maintaining metadata in a storage system, wherein metadata provides information on customer data in the storage system. A first metadata structure includes a plurality of fields, each field having a field length and including information on a block of customer data. A second metadata structure is generated to include a same plurality of fields in the first metadata structure, each field having the same field length as in the first metadata structure, wherein both the first and second metadata structures provide metadata on a same block of customer data. Metadata is included in at least one field in the second metadata structure from at least one field in the first metadata structure. Metadata is included in at least one field in the second metadata structure that is not included in the first metadata structure.

50 Claims, 11 Drawing Sheets

TFD Track for Regular Format
CKD Track Without Keys

TFD Track for Regular Format
CKD Track With Keys

FIG. 5

| Sectors Per Record | Max No. Records | Bits Needed to Express Max No. Records |
|---|---|---|
| 1 | 111 | 7 |
| 2 | 56 | 6 |
| 3 | 37 | 6 |
| 4 | 28 | 5 |
| 5 | 23 | 5 |
| 6 | 19 | 5 |
| 7 | 16 | 5 |
| 8 | 14 | 4 |
| ... | ... | ... |
| 15 | 8 | 4 |
| 16 | 7 | 3 |
| ... | ... | ... |
| 36 | 4 | 3 |
| 37 | 3 | 2 |

FIG. 6

| Sectors Per Record | Bits Needed to Express Max No. Records | Use of Additional Available Bits |
|---|---|---|
| 1 | 7 | No additional available bits |
| 2 or more | 6 | EOF record |
| 4 or more | 5 | 4$^{th}$ TFD flag |
| 8 or more | 4 | 5$^{th}$ TFD flag |
| 16 or more | 3 | 6$^{th}$ TFD flag |
| 37 or more | 2 | 7$^{th}$ TFD flag |

| Flag Bit from Flag Byte | Assigned Bit in No. of Records Field | Assumed Value |
|---|---|---|
| 2 | 2 | 1 |
| 3 | 6 | 0 |
| 4 | 3 | 1 |
| 5 | 5 | 1 |
| 6 | 4 | 0 |
| 7 | 7 | 0 |

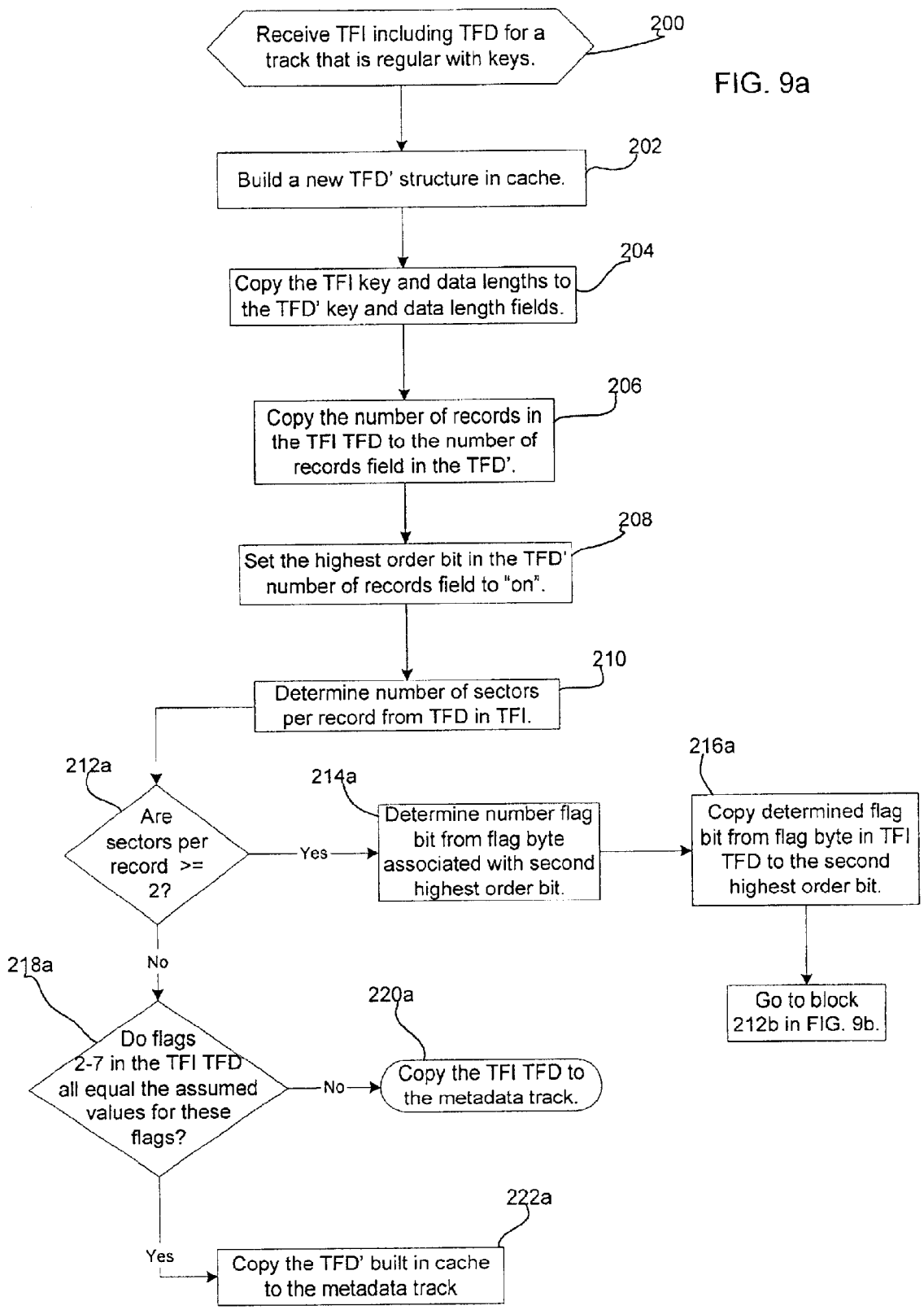

METHOD, SYSTEM, PROGRAM, AND DATA STRUCTURES FOR MAINTAINING METADATA IN A STORAGE SYSTEM

BACKGROUND OF THE INVENTION

1. Field of the Invention

The present invention is related to a method, system, program, and data structures for maintaining metadata in a storage system.

2. Description of the Related Art

Computing systems often include one or more host computers ("hosts") for processing data and running application programs, direct access storage devices (DASDs) for storing data, and a storage controller for controlling the transfer of data between the hosts and the DASD. In addition to storing actual data, also known as user or customer data, the storage controller often maintains metadata which provides information on tracks or blocks of data in the DASD or in a cache of the storage controller. The storage controller processes the metadata during certain operations on the customer data represented by the metadata to improve the speed and efficiency of those requested operations. A track of metadata could include information on anywhere from a few hundred to a couple of thousand of user tracks to all tracks in a volume. The metadata may indicate the layout and format of a customer data track, as well as other information. Typically the rules for accessing metadata are less strict than for customer data because metadata can be rebuilt. Customer data, on the other hand, is often managed in a manner that does not tolerate any potential loss of updates as the updates are not as easily recoverable as metadata.

In operating systems that conform to the International Business Machines Corporation ("IBM") Enterprise Systems Architecture (ESA) 360, 370, and 390 architectures, the storage controller, also referred to as a control unit or storage director, manages access to a storage space comprised of numerous hard disk drives connected in a loop architecture, otherwise referred to as a Direct Access Storage Device (DASD). In such systems, data may be stored in a Count-Key-Data ("CKD") data format. FIG. 1 illustrates a prior art CKD track stored in a CKD device. A home address (HA) identifies the location of the track in the storage unit and its operational status. Following the home address (HA) are the records, $R_0$ through $R_n$. Record zero ($R_0$) contains either system or user data. Each following record, $R_1$ through $R_n$, includes a count area that identifies the record and defines the lengths of the key and data areas. The key area of each record is optional and may be used by the programmer to identify the information in the data area record. The data area contains customer data. The number of records (R) that can be placed on a track depends on the length of the data areas of the records, and whether the records contain a key area, and the size of the gaps. Records may be of equal or unequal lengths.

In the prior art CKD systems, for each CKD track, there is a Track Format Descriptor (TFD), which is a four byte data structure providing metadata on the arrangement of the CKD records on the track. FIGS. 2a and 2b illustrates the prior art structure of a Track Format Descriptor (TFD) when the CKD track described by the metadata is in a regular format without and with keys, respectively. A CKD track that is regular format without keys is a CKD track where all records except Record Zero ($R_0$) and the end of file record (EOF) have the same length data field, referred to in FIG. 1 as data area. The EOF record indicates the end of the CKD track and has a key length and a data length of zero. The flag byte includes bits, where one bit indicates whether the track format is regular, another bit indicates whether the track format is regular with keys, and a third flag indicates whether the track has an EOF record. The other flags may indicate other characteristics of the track format. The TFD further includes in both instances of FIGS. 2a and 2b a byte indicating the number of records in the tracks. Further, in the case of FIG. 2a where the CKD track is regular without keys, two bytes of the TFD indicates the data length of the data areas of each record. In the case of FIG. 2b where the CKD track is regular without keys, ten bits are used for the number of CKD cells per record and six bits are used for the number of fixed blocks per record. If the CKD track is irregular, such that the data areas have different lengths, then the two additional bytes have the number of sectors used by the track.

Moreover, in the prior art, a client or host requesting a CKD track is provided a Track Format Information (TFI) data structure that includes the TFD stored with the customer data and additional fields for the key length and data length of the CKD track. The TFI fields for the key length and data length are returned empty to requesting host. The host would update the key and data length fields in the TFI with appropriate values if the CKD track is regular format with keys. The host would return to the storage controller the update to the customer data along with an updated TFI structure indicating that the track is updated. The storage controller or other device managing Input/Output (I/O) requests to the CKD storage device would then remove the TFD structure from the received TFI to store in the storage system as the metadata for the track being updated. The TFI structure, along with the key and data lengths therein, is discarded. The TFD extracted from the TFI does not include any data on the key length of the CKD track, just a flag indicating whether the track is of regular format with keys.

Write data may be processed in two ways, as a cache fast write (CFW) or a DASD fast write (DFW). A cache fast write operation involves writing data to cache without writing a copy of the update to the non-volatile storage unit (NVS) and without staging the track into cache before writing to the storage unit. A DASD fast write operation writes data to the NVS as well as the cache. In the current art, for a CKD track whose format is regular without keys, a cache fast write can be performed because the storage controller can reconstruct the CKD track format in cache with the updated customer data because the CKD track has data areas of equal length and no keys. However, if the CKD track format is regular with keys, the TFD does not indicate the key length nor data length as shown in FIG. 2b, which is needed to build the CKD track in cache. Because the TFD metadata does not provide information on the key or data length, an update to a CKD track that is of regular format with keys cannot be done without staging the track to update into cache to determine the layout and build the updated CKD track in cache. Requiring the staging of the CKD track into cache to build the update track would offset the benefit of the cache fast write method. Currently the TFD does not include a sufficient number of bytes to indicate the data length and key length, thus requiring that the CKD track to update is staged into cache to determine the layout and build the track in cache, with the proper key and data length formats.

For these reasons, there is a need in the art for improved techniques for providing metadata for tracks, such as CKD tracks, to Input/Output (I/O) processing operations.

SUMMARY OF THE PREFERRED EMBODIMENTS

Provided are a method, system, program, and data structure for maintaining metadata in a storage system, wherein metadata provides information on customer data in the storage system. A first metadata structure includes a plurality of fields, each field having a field length and including information on a block of customer data. A second metadata structure is generated to include a same plurality of fields in the first metadata structure, each field having the same field length as in the first metadata structure, wherein both the first and second metadata structures provide metadata on a same block of customer data. Metadata is included in at least one field in the second metadata structure from at least one field in the first metadata structure. Metadata is included in at least one field in the second metadata structure that is not included in the first metadata structure.

In further implementations, not all of the metadata in the first metadata structure is included in the second metadata structure. Code is provided associating at least one metadata value capable of being included in the first metadata structure with the second metadata structure. A combination of the metadata included in the second metadata structure and the at least one metadata value associated with the second metadata structure comprises all the metadata included in the first metadata structure and additional metadata not maintained in the first metadata structure.

In certain implementations, one field in the second metadata structure includes metadata from one corresponding field in the first metadata structure.

Yet further, bits in the field in the second metadata structure including data from the corresponding field in the first metadata structure are used to store metadata from at least one other field in the first metadata structure.

In further implementations, a determination is made of a number of bits needed to store the metadata in the corresponding field in the first metadata structure. If the determined number of bits is less than the length of the field in the second metadata structure storing metadata from the corresponding field in the first metadata structure, then each bit in the field in the second metadata structure not needed to store the metadata from the corresponding field in the first metadata structure is used to store metadata from at least one other field in the first metadata structure.

In yet further implementations, the second metadata structure is stored in the storage system.

Still further, a determination may be made as to whether the first metadata structure indicates that the customer data represented by the metadata is in a specified format. The second metadata structure is generated and stored in the storage system if the customer data is in the specified format. The first metadata structure is stored in the storage system to provide metadata for the customer data if the customer data is not in the specified format.

With the described implementations, the second metadata structure is provided in certain instances to include more metadata than included in the already deployed first metadata structure to provide further information on the customer data. Further, in certain implementation, the customer data does not need to be staged into cache to complete an I/O operation if the metadata provided with the customer data comprises the second metadata structure. Whereas, if the metadata provided with the customer data comprises the first metadata structure, then the customer data is staged into cache to determine information on the customer data in order to complete the I/O operation.

BRIEF DESCRIPTION OF THE DRAWINGS

Referring now to the drawings in which like reference numbers represent corresponding parts throughout:

FIG. 5 illustrates a correspondence of sectors per record, a maximum possible number of records per track, and a number of binary bits needed to express the maximum possible number of records, wherein the correspondence is used with implementations of the invention;

FIG. 6 illustrates an association of sectors per record, a maximum number of bits needed to indicate the maximum number of possible records per track, and flags that may be represented by additional bits, wherein the association is used with implementations of the invention;

FIGS. 9a, 9b, and 9c illustrate logic to generate a metadata structure in accordance with aspects of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 3:
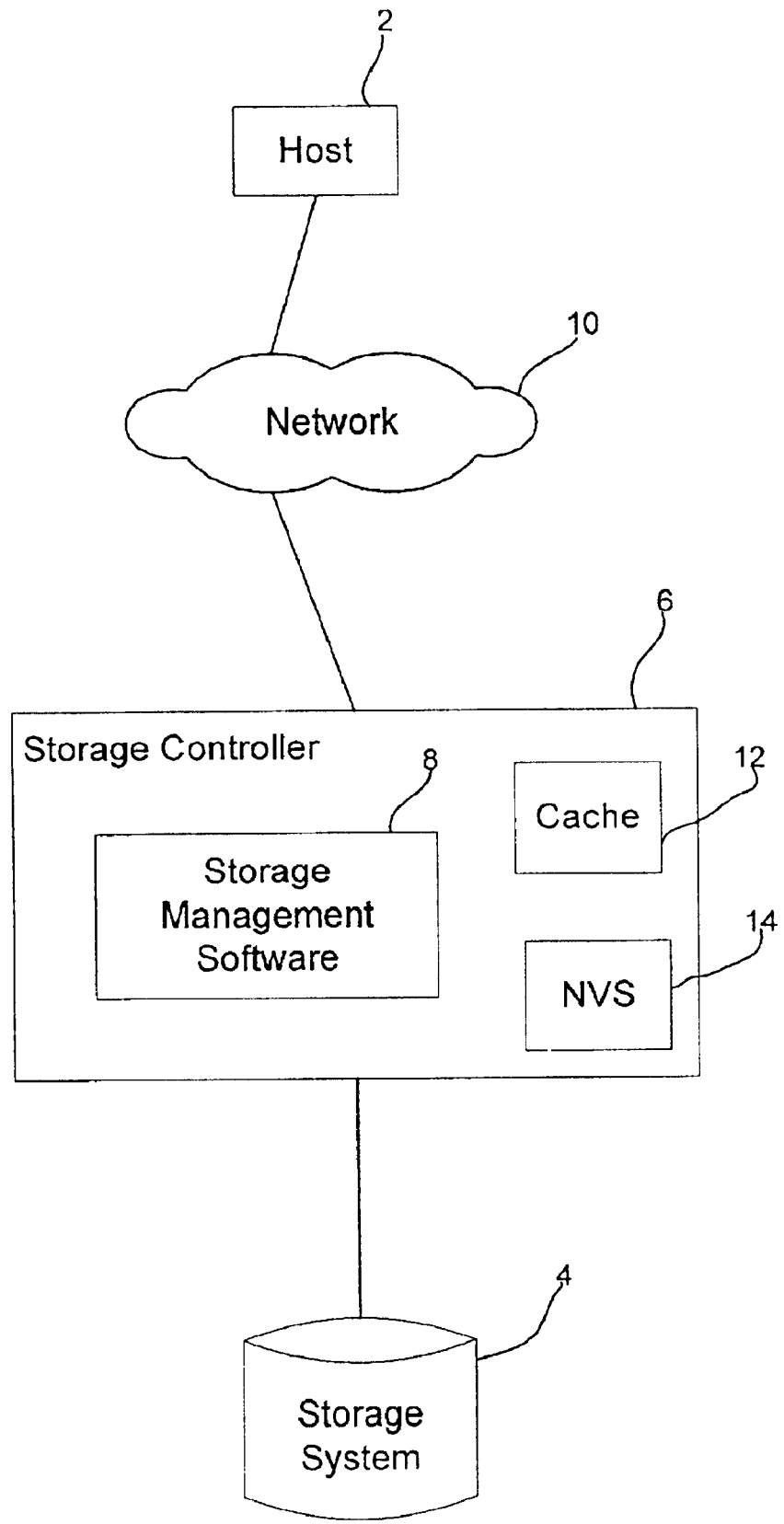
FIG. 3 illustrates a computing environment in which aspects of the invention are implemented.

FIG. 3 illustrates a computing environment in which aspects of the invention are implemented. One or more hosts 2 is in data communication with a storage system 4, such as a DASD or any other storage system known in the art, via a storage controller 6. The storage controller 6 includes storage management software 8 to manage the transfer of Input/Output (I/O) requests between the hosts 2 and storage system 4. The host 2 may be any computing device known in the art, such as a server, mainframe, workstation, personal computer, hand held computer, laptop, telephony device, etc. The storage controller 6 and host system(s) 2 communicate via a network 10, which may comprise a Storage Area Network (SAN), Local Area Network (LAN), Intranet, the Internet, Wide Area Network (WAN), etc. The storage system 4 may be comprised of hard disk drives, tape cartridge libraries, optical disks, or any suitable non-volatile storage medium known in the art. The storage controller 6 may comprise any storage controller or server known in the art, such as the IBM Enterprise Storage Server (ESS).**

**Enterprise Storage Server and IBM are trademarks of International Business Machines Corporation.

The storage controller 6 further includes a cache 12 and non-volatile storage unit (NVS) 14 to provide a non-volatile copy of updates in the cache 12. In a DASD cache fast write operation, data is not written to the NVS 14.

The storage management software 8 includes code to process metadata for each track and manage I/O operations between the host 2 and storage system 4. For instance, in CKD implementations, a Track Format Descriptor (TFD) metadata is provided for each CKD track in the storage system 4, and stored in the storage system 4. The storage management software 8 would utilize the information in the TFD to rebuild the track in cache 12 for an update. By using the metadata, the storage management software 8 avoids the need to stage the track from the storage system 4 to the cache 12 when building the CKD track in cache with the updated data.

Described implementations provide techniques for including key length information with the TFD metadata to avoid having to stage a CKD track to update during a cache fast write operation when the CKD track is regular with keys. As discussed above, in the prior art, because the TFD metadata does not include information on the key length for the CKD track, a track that has a regular format with keys must be staged into cache 12 in order to determine the layout of the update to the track. However, because the prior art TFD format is used by installed systems, in certain implementations, any modification to the TFD format to provide for key length information is preferably backward compatible with the existing structures, including the Track Format Information (TFI) structure that is recognized by currently deployed host 2 systems.

Figure 4:
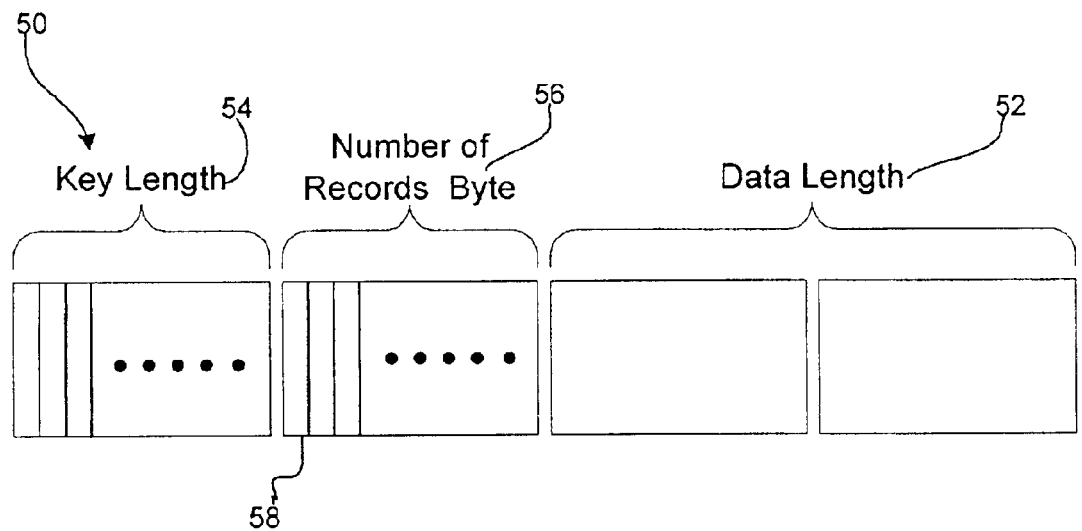
FIG. 4 illustrates a TFD structure in accordance with aspects invention.

In one implementation, a bit from the number of records byte in the TFD is used to indicate whether the track format is regular with keys. As discussed, the prior art number of records byte is used to indicate the number of records per CKD track. In current implementations, because there is a maximum of 112 sectors per CKD track and each CKD record starts at the start of a sector, there are at most 111 records per CKD track, not including record zero ($R_0$). Because 111 or less records can be expressed with seven or fewer bits, the high bit (7) of the number of records byte is always zero. Thus, this high order bit is available for another purpose, such as indicating whether a track format is regular with keys. FIG. 4 illustrates an implementation of a TFD structure 50 in accordance with implementations of the invention. The TFD structure 50 includes a data length field 52 indicating the length of the data area of a record, a key length field 54 indicating the length of the key, and a number of records field 56 indicating the number of records, excluding the Record Zero ($R_0$). In certain implementations, one bit 58 of the number of records field 56, such as the high order bit, indicates whether the CKD track is of a regular format with keys. In this way, the TFD metadata in the described implementations includes both key and data length data as well as metadata indicating whether the track is regular with keys.

Described implementations further provide techniques for using additional bits of the number of records field 56 to indicate further information about the CKD track. The number of additional bits available for use in the number of records field 56 may be determined from the number of sectors used per track. As discussed, there are a maximum number of sectors per track, which in the current art is 112, and a maximum number of records, which in the current art is 111. In the current art, a regular format track has the same number of sectors per record. Knowledge of the number of sectors per record can be used to determine the number of additional bits in the number of records field 56 that may be used to provide metadata on a track. FIG. 5 provides a table 70 showing the maximum number of records 72 for different sectors per record 74 and the number of bits needed to express the maximum number of records. As can be seen, as the number of sectors per record increases on the track, the maximum number of records that may be included on that track decreases, and the number of bits needed to be available to express the maximum possible number of records likewise decreases, thereby freeing up bits in the number of records field 56 to store additional metadata.

Figure 1:
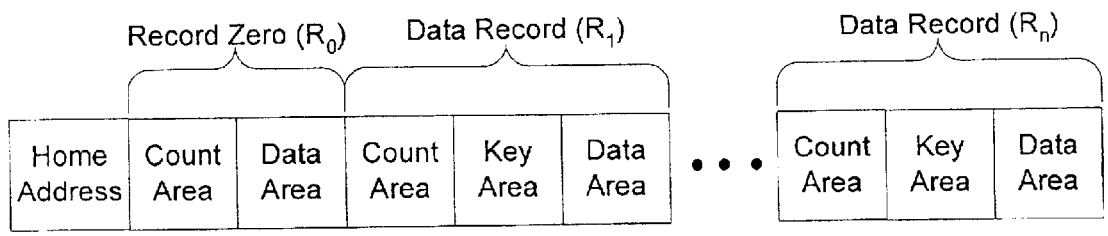
FIG. 1 illustrates a prior art Count-Key-Data track.
Figure 2A:
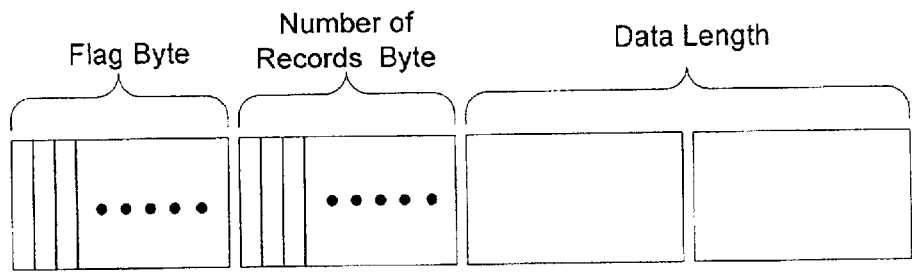
FIGS. 2a and 2b illustrate prior art Track Format Descriptor (TFD) data structures providing metadata on CKD tracks.
Figure 2B:
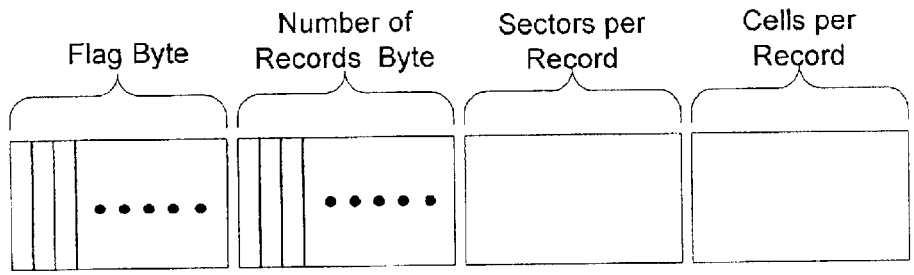

The bits not used in the number of records field 56, which are a function of the number of sectors per track, may then be used to provide information that was previously provided in the flags in the flag byte of the prior art TFD structure shown in FIGS. 2a and 2b. The TFD structure 50 (FIG. 4) of the described implementations effectively uses the flag byte field of the prior art TFD structure shown in FIGS. 2a and 2b for the key length field 56 to store information on the key length. In the described implementations, the storage management software 8 may utilize available bits in the number of records field 56 for flags originally included in the flag byte of the TFD track of FIGS. 2a and 2b in the TFD structure 50 of FIG. 5. In this way, the TFD track is modified to use include key length information into existing bits and still provide room for data from the flag byte field.

FIG. 6 is a table 80 illustrating how bits in the number of records field 56 may be used to provide metadata information as the number of sectors per record increases. As the number of sectors per record 82 increases, fewer bits 84 are needed to express the maximum number of possible records per track. For each additional available bit 86 not needed to express the maximum possible number of records per track, a next highest order bit, also known as a next most significant bit, may be used for a flag bit from the flag byte field. The storage management software 8 would be encoded to use additional high order bits for certain of the metadata information in the Flag Byte field from the original TFD, as shown in FIGS. 2a and 2b. In table 80, the highest order bit is used to indicate whether the CKD track includes an EOF record and following highest order bits are used for different flag bits from the Flag Byte. The assignment of metadata from the Flag Byte field to available bits may be based on an empirical analysis of the bits in the Flag Byte most likely to have a value that varies. Thus, the bits in the Flag Byte that are more likely to have a value that varies are assigned to higher order bits in the number of records field, whereas flags less likely to vary in value are assigned to the lower order bits that open up as the number of sectors per record increases. This increases the likelihood that an available bit is available for those types of metadata or flags likely to have values that vary.

Figures 7, 8:
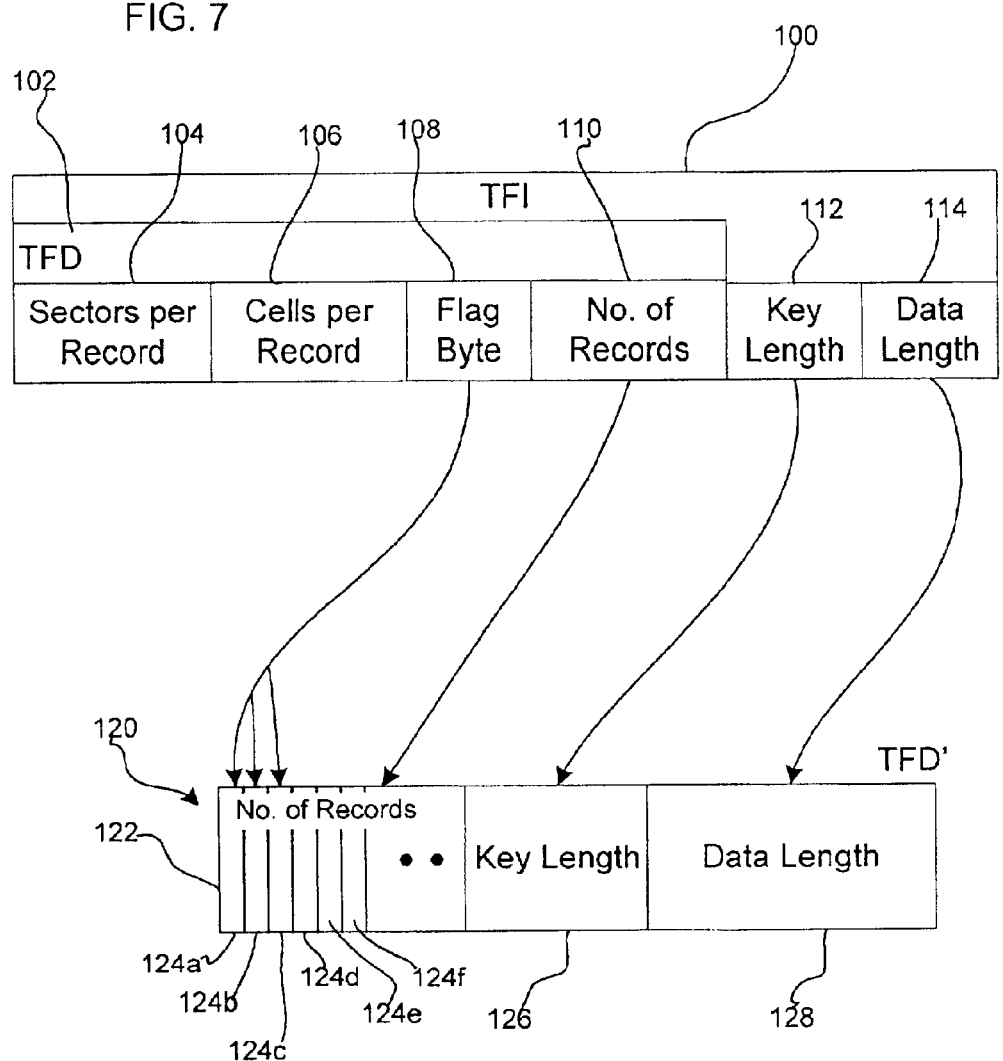
FIG. 7 illustrates how data in the prior art Track Format Information (TFI) and TFD structures relate to a metadata structure in accordance with aspects invention.
FIG. 8 illustrates an association of bits in the flag byte field of the TFD, and an assigned bit in the number of records field, and an assumed value used with implementations of the invention.

FIG. 7 shows how fields in a prior art TFI 100 and TFD 102 structures map to a new TFD' structure 120 in accordance with the described implementations. The TFI structure 100 includes the prior art TFD structure 102, which includes a sectors per record field 104, a cells per record field 106, a flags byte 108, and number of records field 110, such as further shown in FIGS. 2a and 2b. The TFI structure 100 further includes a key length 112 and data length 114 fields indicating the key length and data length for the CKD track. The storage management software 8 would generate a TFD' structure 120 in accordance with the described implementations by mapping the key length 112 and data length 114 in the TFI 100 to key length 126 and data length 128 fields in the TFD' 120. The high order (most significant) bit 124a in the number of records field 122, which in the prior art is unused, is set to "on" to indicate that the CKD track is regular with keys. Further, flags from the flag byte 108 in the TFD 100 are mapped to the next highest order (most significant) bits 124b . . . 124f in the number of records field 122 of the new TFD' 120. As discussed, the number of available bits is a function of the maximum number of possible records, which is a function of the number of sectors per record.

Further, the storage management software 8 is coded to provide an association of each flag in the flag byte field 108 to assumed values and to a particular available bit 124a . . . 124f. As discussed, the first three flag values of the current TFD flag byte implementations indicate whether the track format is regular, with keys and includes an EOF record. Because the new TFD' is specifically generated for a CKD track of regular format with keys, the first two flags from the old TFD flag byte are not needed. The state indicated by the first two flags in the flag byte 108 of the prior art TFD 102 is represented by the high order bit 124a in the number of records field 122 of the TFD' structure 120 in accordance with the described implementations.

FIG. 8 illustrates an example of how the storage management software 8 maps flags from the flag byte field 108 of the TFI TFD 102 map to an assigned bit in the number of records field 122 of the new TFD' 120, and that there is an assumed value for the flag. If the number of records 110 field has a maximum number of possible values that does not leave space for a bit for an assigned flag value from the flag byte field 108 and the actual flag value in the flag byte field 108 is not the assumed flag value, then the new TFD' 120 format cannot accurately define the layout of the CKD track because neither the number of records 122 field nor assumed values can fully represent the flag values and key length information in the TFI 100 for the track. In such case, the CKD track is marked regular with keys and the prior art TFD 102 provided in the TFI 100 is used as the metadata. When the prior art TFD 102 metadata structure is used, the CKD track to update must be staged into cache to determine the key and data length of the track to update. Thus, the assumed value is only considered if the number of records field 120 does not include enough available bits to store the corresponding flag bit. The assumed value may be set based on the most likely value for that flag to increase the likelihood that the new TFD format may be used to express information on a track with regular format and keys. In FIG. 8, only the flags two through seven are included because, in certain implementations, the first two flags 0 and 1 indicate whether the track is regular with keys, which is indicated in the high order bit 124a of the new TFD structure 10. Thus, the EOF flag and flags three through seven are allocated to any available bits 124b . . . 124f in the number of records field 122. As discussed, the more a flag bit is likely to vary in value, the higher the bit to which that flag bit is assigned, such that those flag bits more likely to vary are also more likely to be indicated in an available bit 124a . . . 124f in the number of records field 122.

Figure 9B:
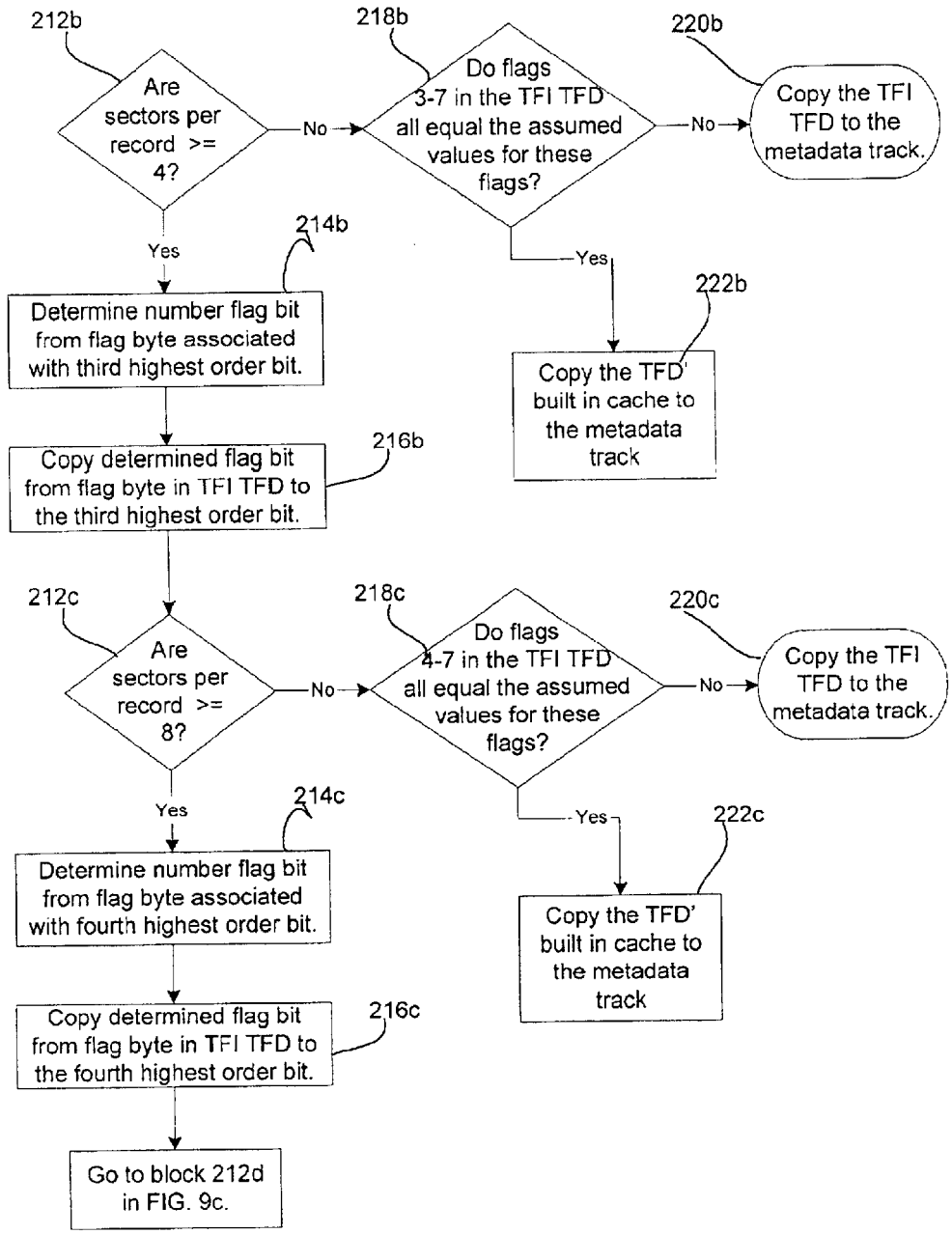
Figure 9C:
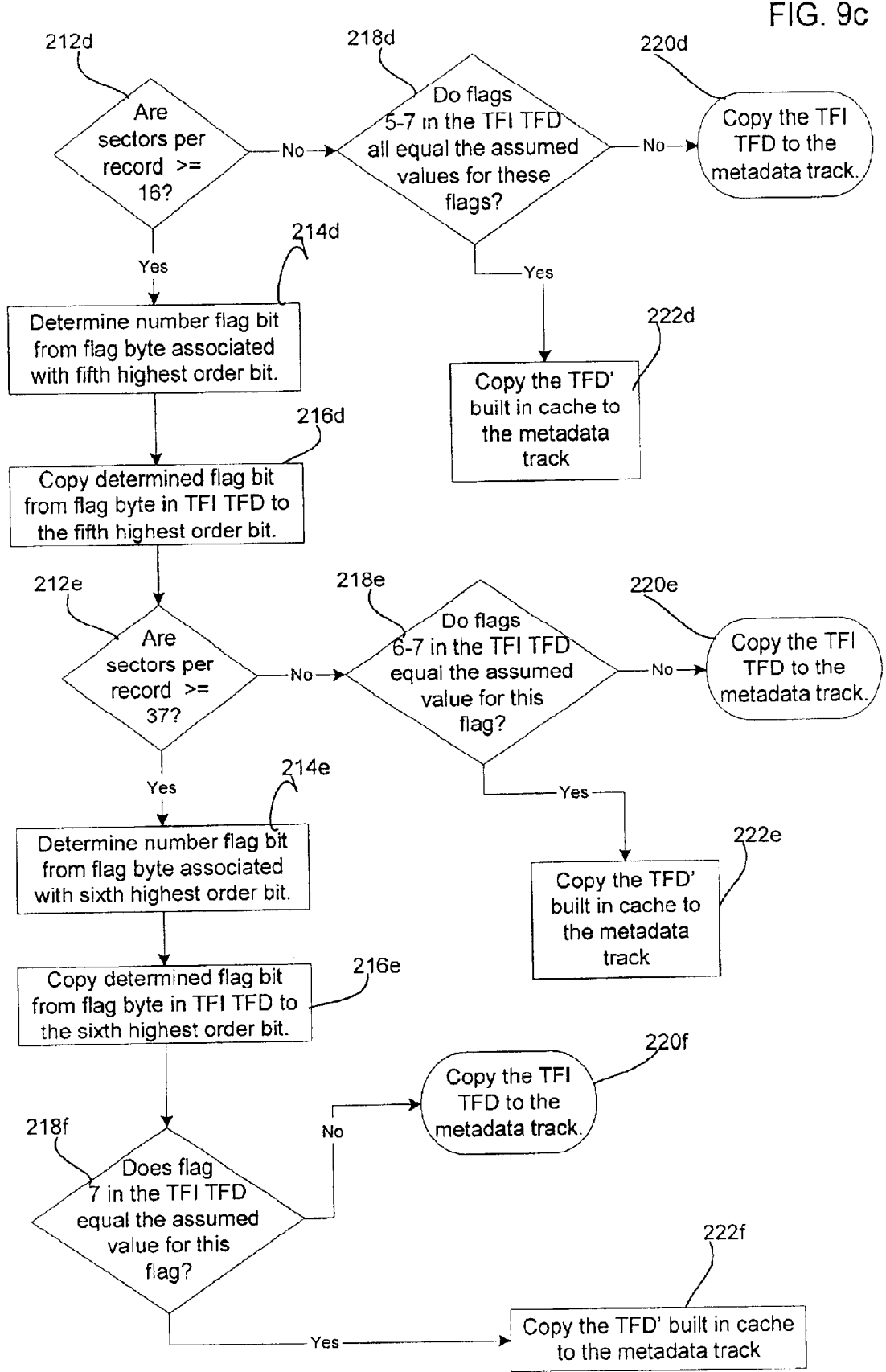

FIGS. 9a, 9b, and 9c illustrate logic implemented in the storage management software 8 to generate a TFD' data structure 120 in accordance with the described implementations to include information on the key length when the track is regular with keys. With respect to FIG. 9a, control begins at block 200 when the storage management software 8 receives from a host 2 a TFI 100 data structure including the TFD 102 that provides metadata for a regular track with keys. As discussed the host may have added the key and data lengths to the TFI structure 100. In response, the storage management software 8 builds (at block 202) a new TFD' 120 data structure in the cache 12. The key 112 and data 114 length fields in the TFI 100 data structure are copied (at block 204) to the key 126 and data 128 length fields in the TFD' 120. The number of records 110 in the TFI 100 are then copied (at block 206) to the number of records field 122 in the new TFD' 120. The highest order (most significant) bit 124a in the number of records field 122 is set (at block 208) to "on" indicating that the corresponding CKD track is regular with keys.

The storage management software 8 then determines (at block 210) from the sectors per record field 104 in the TFI TFD 102 the number of sectors per record. If (at block 212a) the number of sectors per record is greater than or equal to two, then there is at least one additional available bit in the number of records field 120 for use as a flag value. In such case, the storage management software 8 determines (at block 214a) the flag bit in the flag byte 108 of the TFD 102 that is assigned to the highest order bit, i.e., most significant bit, such as shown in FIG. 7. The determined flag bit from the flag byte 108 field is then copied (at block 216a) to the second highest order bit 124b, i.e., second most significant bit, in the number of records field 122 in the new TFD' 120. If (at block 212a) the number of sectors per record are not greater than two, then no additional bits from the number of records field 122 are available to store flags from the flag byte 108. In such case, the storage management software 8 determines (at block 218a) whether the remaining flag bits 2 through 7 match the assumed value for these flags. If not, then the TFI TFD 102 is copied (at block 220a) to the metadata track in the storage system 4 because the new TFD' 120 being built cannot be used to accurately provide information on the CKD track represented by the TFI 100 structure because the values that would be assumed by the TFD' 120 do not match all the actual bit values in the flag byte 108 in the TFI TFD 102. Otherwise, if (at block 218a) the assumed flag bits for the TFD' 120 match all the actual bits in the flag byte 108, then the TFD' 120 built in cache 12 is copied (at block 222a) to the storage system 4. The TFD' 120 of the described implementations thus incorporates all of the information in the previous version of the TFD as shown in FIG. 2b and key information from the TFI through express and assumed bit values.

If the determined number of sectors per record is greater than two, then after copying the determined flag bit in the flag byte 108 associated with the second highest order bit 124b to such first available bit 124b at block 216a, control proceeds to block 212b in FIG. 9b. The storage management software 8 performs the same steps at blocks 212b–222b that were performed at blocks 212a–222a, except that the determination is whether a third highest order bit 124c, i.e., third most significant bit, is available in the number of records field 122 to store the bit in the flag byte field 108 associated with such third most significant bit 124c. For this reason, the determinations at blocks 212b–222b differ from the operations at steps 212a–222a as follows: at block 212b, the determination is whether the sectors per record is greater than four; at block 214b, the determination of the flag bit from the flag byte 108 to copy is of the flag bit associated with the third highest order (most significant) bit 124c; at block 216b, the flag bit in the flag byte 108 associated with the third highest order bit 124c is copied to such third highest order bit 124c; at block 218b, the determination is whether the flags 3–7 in the flab byte 108 of the TFI TFD 102 match the corresponding assumed values for such flags. Similarly, the determinations at blocks 212c–222c, 212d–222d, 212e–222e, and 218f–222f in FIG. 9c are performed for cases where the number of sectors per record are 8, 16, and 37, respectively, to determine whether there are a third 124d, fourth 124e, and fifth 124f available bits (i.e., fourth, fifth and sixth highest order (most significant) bits) in the number of records field 120 of the new TFD' 122 that can be used to store associated bits from the flag byte field 108.

Figure 10A:
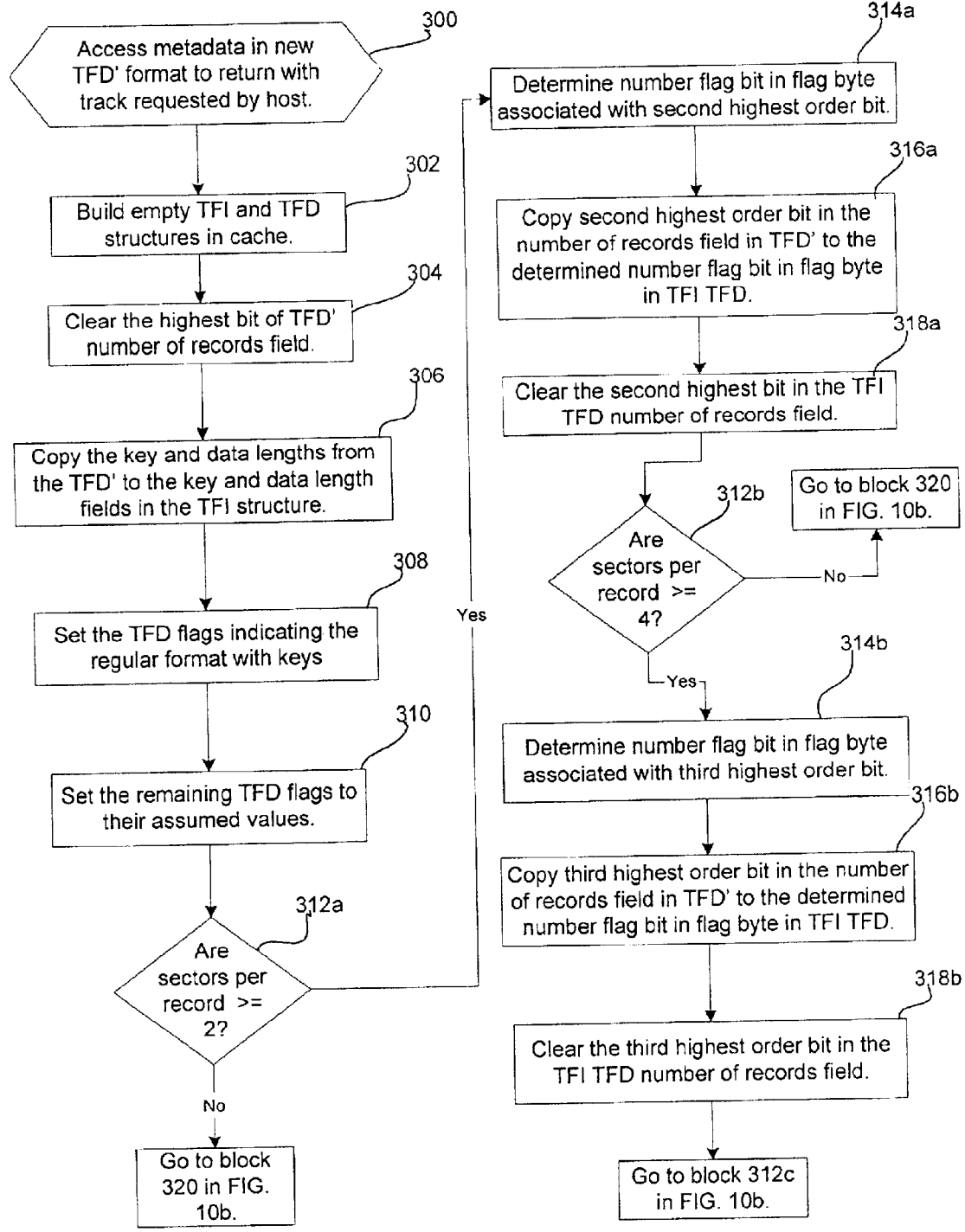
FIGS. 10a and 10b illustrates logic to generate a metadata structure to return to a host from the metadata structure in accordance with aspects of the invention.
Figure 10B:
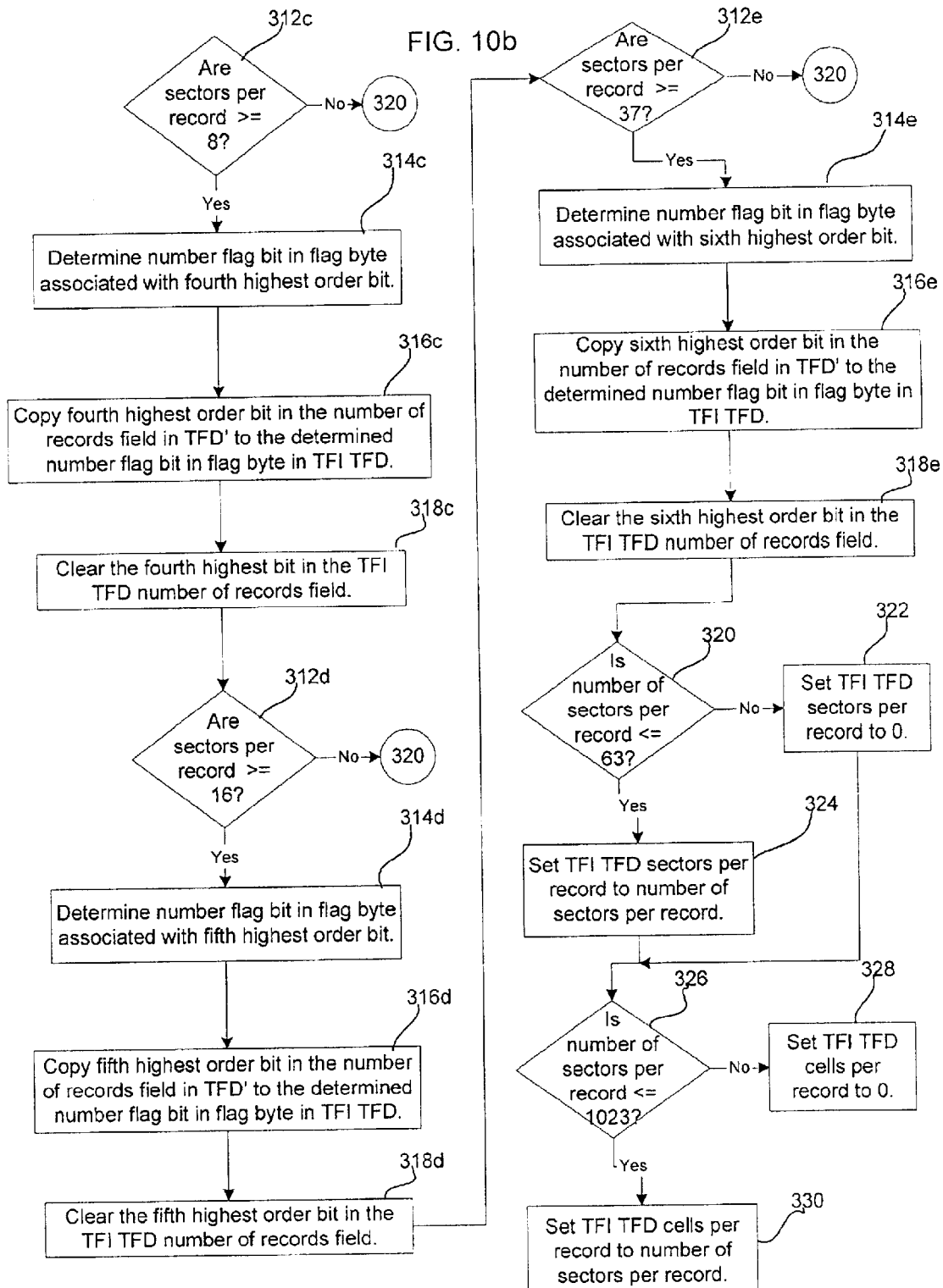

FIGS. 10a and 10b illustrate logic implemented in the storage management software 8 to build a TFI data structure 100 from a TFD metadata track in the storage system 4 to return to the host 2 with the associated CKD track. With the logic of FIGS. 10a and 10b, the storage management software 8 is capable of providing the data in the new TFD' 120 stored in the storage system to a host which may only be capable of interpreting the TFI 100 and TFD 102 in the prior art format. In this way, the TFD' data structure 120 of the described implementations is backwards compatible with systems only understanding the prior art TFI 100 and TFD 102 data structures through translation operations performed by the storage management software 8. FIGS. 10a and 10b are described with reference to FIG. 7, such that the storage management software 8 will generate the TFI 100 and TFD 102 data structure from a TFD' 120 accessed from the metadata track in the storage system 4. Control begins at block 300 when the storage management software 8 accesses metadata in the new TFD' 120 format from the storage system 4 to return with a requested CKD track to the requesting host 2. The storage management software 8 can distinguish a TFD track in the new format because the high order bit 124a in the number of records field 122 is set "on"; whereas in the prior art TFD data structure, the high order bit 124a of the number of records field is always zero because this bit is not needed to express the maximum number of possible records on a CKD track.

Upon accessing the TFD' track 120, the storage management software 8 builds (at block 302) an empty TFI 100 data structure in cache 12 with an empty TFD 102, where the TFD 102 structure would conform to the prior art TFD structure to allow backward compatibility with currently deployed host systems. The high order (most significant) bit in the number of records field 110 is cleared (at block 304) to zero, which is the value that is always present in the prior art TFD format. The storage management software 8 then copies (at block 306) the key and data lengths from the fields 126 and 128, respectively, into the corresponding fields 112 and 114 in the TFI data structure 100 (FIG. 6) being built in cache 12. The first two flags in the flags byte of the TFD are then set (at block 308) to indicate that the track is of regular format with keys. The remaining flags at bits 2–7 in the flag byte being built are then set (at block 310) to the assumed values for such bits.

If (at block 312a) the sectors per record are greater than or equal to two, then the storage management software 8 determines (at block 314a) the flag bit in the flag byte field of the TFD being built associated with the second highest order (most significant) bit 124b in the accessed TFD' 120. The sectors per record may be determined from the number of sectors needed for the data length 128 and key length 126 specified in the accessed TFD' 120. The second highest order (most significant) bit 124b in the number of records field 122 of the accessed TFD' 120 is then copied (at block 316a) to the determined flag bit in the flag byte field 108 in the TFD 102 being built. The second highest bit in the number of records field 110 is then cleared (at block 318a) because the maximum possible number of records will not need such bit to express the number of records on the track.

After clearing the second high order bit, control proceeds to block 312b. The storage management software 8 performs the same steps at blocks 312b–318b that were performed at blocks 312a–318a, except that the determination is whether there are four or more sectors per record, which means that a second bit 124c in the number of records field 122 stores the flag bit for the flag byte field 108 associated with such third highest order (most significant) bit 124c. For this reason, the determinations at blocks 312b–318b differ from the operations at steps 312a–318a as follows: at block 312b, the determination is whether the sectors per record is greater than four; at block 314b, the determination of the target flag bit in the flag byte 108 to receive the flag value stored in the number of records field 122 is of the flag bit associated with the third highest order bit 124c; at block 316b, the third highest order bit 124c value is copied to the determined flag bit in the flag byte 108 associated with the third highest order bit 124c; and at block 318b, the second highest bit in the number of records field 110 in the TFD 102 is cleared. Similarly, the steps at blocks 312c–318c, 312d–318d and 312e–318e (FIG. 10b) are performed for cases where the number of sectors per record are 8, 16, and 37, respectively, to determine whether the third 124d, fourth 124e, and fifth 124f bits in the number of records field 120 of the new TFD' 122 include values to copy into the associated flag bits in the flag byte field 108 being built.

If at blocks 312a, 312b, 312c, 312d, and 312e the number of sectors per record is not greater than 2, 4, 8, 16, and 37, respectively, then control proceeds to block 320 where the storage management software 8 determines whether the number of sectors per record is less than or equal to sixty-three. If not, the sectors per record 104 in the TFI TFD 102 is set (at block 322) to zero; otherwise, the sectors per record is set (at block 324) to the actual number of sectors per record. Further, if (at block 326) the number of sectors per record is less than or equal to 1023, then the cells per record field 106 in the TFI TFD 102 is set (at block 330) to the number of sectors per record; otherwise, the cells per record is set (at block 328) to zero.

The described implementations provide a technique to incorporate information in a metadata track stored with the customer data, e.g., a CKD track, that was not previously able to be incorporated, such as the key and length fields for a CKD track of regular format with keys. This is accomplished by utilizing unused fields in certain of the metadata fields, such as the number of records field, and making assumptions on information not able to be included in the bits of other fields in the data structure. Further, with the described implementations, the metadata structure of the described implementations is backwards compatible with host systems only able to interpret the previous version of the metadata data structure, e.g., the prior art TFD data structure, because the data from the metadata data structure of the described implementations is generated into the prior art metadata data structure, e.g., the TFI structure, to return to the host.

For instance, by including information not previously included in the stored metadata (TFD), the metadata returned to the host in the form of the TFI is generated to include information, such as the key and data length fields, that was not previously returned in the TFI data structure. Instead, in the prior art, the customer would have to determine such information. Thus, the described implementations are capable of providing additional information on the requested track to the requesting host that was previously unavailable because such information was not stored with the metadata. In the prior art, the host would have to stage the actual customer CKD track into cache to determine all the needed metadata information. With the described implementations, such information is stored with the metadata and may be made available to the host from the retrieved metadata so that the host does not have to stage the actual customer track into cache to determine such information.

Additional Implementation Details

The described metadata management techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Gate Arrays, Application Specific Integrated Circuit (ASIC), etc.) or a computer readable medium such as, magnetic storage medium (e.g. hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

The described implementations included a storage system having a storage controller, host, and DASD system. The described metadata management techniques may be used with any type of storage system arrangement, where a processor or controller accesses and utilizes data from a storage device.

Described implementations utilized the CKD record format, where user data is stored in CKD records on a track, such that each CKD record includes a count field and may include a key field. In alternative implementations, the described metadata techniques may apply to other data storage formats in which data is stored in blocks or tracks that includes customer data and other information.

The described metadata track provided information on a CKD track having a regular format with keys. Additionally, the described implementations may apply to tracks of data other than CKD tracks having a regular format with keys.

The described implementations described a transformation from a TFI data structure including a TFD structure to a new TFD metadata structure that stores information from both the TFI and TFD structures. The transformation techniques described herein may apply to alternative metadata data structures for CKD or other data formats where the host or client must still stage the track into cache to determine all needed metadata. For instance, the technique of determining bits in the fields of the metadata data structure to store additional metadata may apply to the storage of metadata in formats other than the TFD and TFI structures described herein.

In certain described implementations, available free bits to use to store metadata were found in the number of records field. In alternative implementations, available free bits to store additional metadata may be found in alternative fields of the metadata structure.

In the described implementations, flags were copied from the TFD and TFI structures into the highest order bits of the flag byte field. In alternative implementations, the flag bits copied from the TFD and TFI structures may be placed in locations in the flag byte field other than a next available highest order bit.

The flowcharts of FIGS. 9a, 9b, 9c, 10a, and 10b described specific operations occurring in a particular order. Further, the steps may be performed in parallel as well as sequentially. In alternative embodiments, certain of the logic operations may be performed in a different order, modified or removed and still implement preferred embodiments of the present invention. Morever, steps may be added to the above described logic and still conform to the preferred embodiments. Yet further, steps may be performed by a single processing unit or by distributed processing units.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for maintaining metadata in a storage system, wherein metadata provides information on customer data in the storage system, comprising:

providing a first metadata structure including a plurality of fields, each field having a field length and including information on a block of customer data;

generating a second metadata structure including a same plurality of fields in the first metadata structure, each field having the same field length as in the first metadata structure, wherein both the first and second metadata structures provide metadata on a same block of customer data;

including metadata in at least one field in the second metadata structure from at least one field in the first metadata structure; and including metadata in at least one field in the second metadata structure that is not included in the first metadata structure.

2. The method of claim 1, wherein not all of the metadata in the first metadata structure is included in the second metadata structure, further comprising:

associating at least one metadata value capable of being included in the first metadata structure with the second metadata structure, whereby a combination of the metadata included in the second metadata structure and the at least one metadata value associated with the second metadata structure comprises all the metadata included in the first metadata structure and additional metadata not maintained in the first metadata structure.

3. The method of claim 1, wherein one field in the second metadata structure includes metadata from one corresponding field in the first metadata structure.

4. The method of claim 3, wherein bits in the field in the second metadata structure including data from the corresponding field in the first metadata structure are used to store metadata from at least one other field in the first metadata structure.

5. The method of claim 4, further comprising;

providing an association of metadata values with the second metadata structure for metadata in the first metadata structure not included in the second metadata structure.

6. The method of claim 5, further comprising:
   determining whether the metadata values associated with the second metadata structure match metadata values in the first metadata structure that are not included in the second metadata structure;
   storing the second metadata structure in the storage system if there is a match; and
   storing the first metadata structure in the storage system if there is not a match of all metadata values associated with the second metadata structure and the metadata values in the first metadata structure not included in the second metadata structure.

7. The method of claim 4, further comprising:
   determining a number of bits needed to store the metadata in the corresponding field in the first metadata structure; and
   if the determined number of bits is less than the length of the field in the second metadata structure storing metadata from the corresponding field in the first metadata structure, then using each bit in the field in the second metadata structure not needed to store the metadata from the corresponding field in the first metadata structure to store metadata from at least one other field in the first metadata structure.

8. The method of claim 7, further comprising:
   providing an association of each bit in the field in the second metadata structure that is capable of not being used to store the metadata from the corresponding field in the first metadata structure with one bit in one field in the first metadata structure, wherein the associated bit in the field in the first metadata structure is included in the associated bit in the field in the second metadata structure if the bit in the second metadata structure is not needed to store the metadata in the corresponding field in the first metadata structure.

9. The method of claim 7, further comprising:
   determining a value from one field in the first metadata structure, wherein the determined value is used to determine the number of bits needed to store the metadata from the corresponding field in the first metadata structure.

10. The method of claim 9, wherein the corresponding field in the first metadata structure indicates a number of records in a track of the customer data, and wherein the determined value indicates a number of sectors per record, wherein the maximum number of records that may be stored in the track of customer data is a function of the number of sectors per record.

11. The method of claim 1, wherein providing the first metadata structure further comprises:
    accessing the first metadata structure from a third metadata structure, wherein the third metadata structure includes fields in addition to those in the first metadata structure; and
    including data from the additional fields in the third metadata structure in at least one field in the second metadata structure.

12. The method of claim 11, wherein the customer data is stored in a Count-Key-Data (CKD) track in the storage system, wherein there is one first and second metadata structure for each track, wherein the first metadata structure comprises a Track Format Descriptor (TFD) structure and wherein the third metadata structure comprises a Track Format Information (TFI) structure.

13. The method of claim 1, further comprising storing the second metadata structure in the storage system.

14. The method of claim 13, further comprising:
    determining whether the first metadata structure indicates that the customer data represented by the metadata is in a specified format, wherein the second metadata structure is generated and stored in the storage system if the customer data is in the specified format; and
    storing the first metadata structure in the storage system to provide metadata for the customer data if the customer data is not in the specified format.

15. The method of claim 14, wherein the customer data is stored in a Count-Key-Data (CKD) track in the storage system and wherein the specified format indicates that the CKD track is regular with keys.

16. The method of claim 14, further comprising:
    retrieving the second metadata structure from the storage system in response to a request for the customer data described by the retrieved second metadata structure; and
    generating the first metadata structure to include metadata in the retrieved second metadata structure, wherein the metadata included in the first metadata structure does not include all of the metadata in the retrieved second metadata structure.

17. The method of claim 16, further comprising:
    returning the generated first metadata structure with the customer data described by the generated first metadata structure.

18. The method of claim 16, further comprising:
    generating a third metadata structure to include metadata in the second metadata structure that is not included in the generated first metadata structure.

19. The method of claim 18, further comprising:
    including the first metadata structure within the third metadata structure, wherein the first and third metadata structures combined indicate all of the metadata in the retrieved second metadata structure.

20. The method of claim 1, further comprising:
    staging the customer data into cache to determine information on the customer data needed to complete an I/O operation if the metadata provided for the customer data comprises the first metadata structure, wherein the customer data does not need to be staged into cache in order to complete the I/O operation if the metadata provided with the customer data comprises the second metadata structure.

21. The method of claim 20, wherein the I/O operation comprises a cache fast write.

22. A system for maintaining metadata in a storage system, wherein metadata provides information on customer data in the storage system, comprising:
    means for providing a first metadata structure including a plurality of fields, each field having a field length and including information on a block of customer data;
    means for generating a second metadata structure including a same plurality of fields in the first metadata structure, each field having the same field length as in the first metadata structure, wherein both the first and second metadata structures provide metadata on a same block of customer data;
    means for including metadata in at least one field in the second metadata structure from at least one field in the first metadata structure; and
    means for including metadata in at least one field in the second metadata structure that is not included in the first metadata structure.

23. The system of claim 22, wherein not all of the metadata in the first metadata structure is included in the second metadata structure, further comprising:
  means for associating at least one metadata value capable of being included in the first metadata structure with the second metadata structure, whereby a combination of the metadata included in the second metadata structure and the at least one metadata value associated with the second metadata structure comprises all the metadata included in the first metadata structure and additional metadata not maintained in the first metadata structure.

24. The system of claim 22, wherein one field in the second metadata structure includes metadata from one corresponding field in the first metadata structure.

25. The system of claim 24, wherein bits in the field in the second metadata structure including data from the corresponding field in the first metadata structure are used to store metadata from at least one other field in the first metadata structure.

26. The system of claim 25, further comprising;
  means for providing an association of metadata values with the second metadata structure for metadata in the first metadata structure not included in the second metadata structure.

27. The system of claim 25, further comprising:
  means for determining a number of bits needed to store the metadata in the corresponding field in the first metadata structure; and
  means for using each bit in the field in the second metadata structure not needed to store the metadata from the corresponding field in the first metadata structure to store metadata from at least one other field in the first metadata structure if the determined number of bits is less than the length of the field in the second metadata structure storing metadata from the corresponding field in the first metadata structure.

28. The system of claim 22, wherein the means for providing the first metadata structure further performs:
  means for accessing the first metadata structure from a third metadata structure, wherein the third metadata structure includes fields in addition to those in the first metadata structure; and
  means for including data from the additional fields in the third metadata structure in at least one field in the second metadata structure.

29. The system of claim 28, wherein the customer data is stored in a Count-Key-Data (CKD) track in the storage system, wherein there is one first and second metadata structure for each track, wherein the first metadata structure comprises a Track Format Descriptor (TFD) structure and wherein the third metadata structure comprises a Track Format Information (TFI) structure.

30. The system of claim 22, further comprising:
  means for storing the second metadata structure in the storage system;
  means for determining whether the first metadata structure indicates that the customer data represented by the metadata is in a specified format, wherein the second metadata structure is generated and stored in the storage system if the customer data is in the specified format; and
  means for storing the first metadata structure in the storage system to provide metadata for the customer data if the customer data is not in the specified format.

31. The system of claim 30, further comprising:
  means for retrieving the second metadata structure from the storage system in response to a request for the customer data described by the retrieved second metadata structure; and
  means for generating the first metadata structure to include metadata in the retrieved second metadata structure, wherein the metadata included in the first metadata structure does not include all of the metadata in the retrieved second metadata structure.

32. The system of claim 22, further comprising:
  a cache; and
  means for staging the customer data into the cache to determine information on the customer data needed to complete an I/O operation if the metadata provided for the customer data comprises the first metadata structure, wherein the customer data does not need to be staged into cache in order to complete the I/O operation if the metadata provided with the customer data comprises the second metadata structure.

33. An article of manufacture configured to maintain metadata in a storage system, wherein metadata provides information on customer data in the storage system, wherein the configured article of manufacture causes operations to be performed, the operations comprising:
  providing a first metadata structure including a plurality of fields, each field having a field length and including information on a block of customer data;
  generating a second metadata structure including a same plurality of fields in the first metadata structure, each field having the same field length as in the first metadata structure, wherein both the first and second metadata structures provide metadata on a same block of customer data;
  including metadata in at least one field in the second metadata structure from at least one field in the first metadata structure; and
  including metadata in at least one field in the second metadata structure that is not included in the first metadata structure.

34. The article of manufacture of claim 33, wherein not all of the metadata in the first metadata structure is included in the second metadata structure, further comprising:
  associating at least one metadata value capable of being included in the first metadata structure with the second metadata structure, whereby a combination of the metadata included in the second metadata structure and the at least one metadata value associated with the second metadata structure comprises all the metadata included in the first metadata structure and additional metadata not maintained in the first metadata structure.

35. The article of manufacture of claim 33, wherein one field in the second metadata structure includes metadata from one corresponding field in the first metadata structure.

36. The article of manufacture of claim 35, wherein bits in the field in the second metadata structure including data from the corresponding field in the first metadata structure are used to store metadata from at least one other field in the first metadata structure.

37. The article of manufacture of claim 36, further comprising;
  providing an association of metadata values with the second metadata structure for metadata in the first metadata structure not included in the second metadata structure.

38. The article of manufacture of claim 36, further comprising:
  determining a number of bits needed to store the metadata in the corresponding field in the first metadata structure; and if the determined number of bits is less than the length of the field in the second metadata structure storing metadata from the corresponding field in the first metadata structure, then using each bit in the field in the second metadata structure not needed to store the metadata from the corresponding field in the first metadata structure to store metadata from at least one other field in the first metadata structure.

39. The article of manufacture of claim 33, wherein providing the first metadata structure further comprises:
accessing the first metadata structure from a third metadata structure, wherein the third metadata structure includes fields in addition to those in the first metadata structure; and
including data from the additional fields in the third metadata structure in at least one field in the second metadata structure.

40. The article of manufacture of claim 39, wherein the customer data is stored in a Count-Key-Data (CKD) track in the storage system, wherein there is one first and second metadata structure for each track, wherein the first metadata structure comprises a Track Format Descriptor (TFD) structure and wherein the third metadata structure comprises a Track Format Information (TFI) structure.

41. The article of manufacture of claim 33, further comprising:
storing the second metadata structure in the storage system;
determining whether the first metadata structure indicates that the customer data represented by the metadata is in a specified format, wherein the second metadata structure is generated and stored in the storage system if the customer data is in the specified format; and
storing the first metadata structure in the storage system to provide metadata for the customer data if the customer data is not in the specified format.

42. The article of manufacture of claim 41, further comprising:
retrieving the second metadata structure from the storage system in response to a request for the customer data described by the retrieved second metadata structure; and
generating the first metadata structure to include metadata in the retrieved second metadata structure, wherein the metadata included in the first metadata structure does not include all of the metadata in the retrieved second metadata structure.

43. The article of manufacture of claim 33, further comprising:
staging the customer data into cache to determine information on the customer data needed to complete an I/O operation if the metadata provided for the customer data comprises the first metadata structure, wherein the customer data does not need to be staged into cache in order to complete the I/O operation if the metadata provided with the customer data comprises the second metadata structure.

44. A computer readable medium including at least one data structure for maintaining metadata in a storage system, wherein metadata provides information on customer data in the storage system, wherein the at least one data structure comprises:
a first metadata structure including a plurality of fields, each field having a field length and including information on a block of customer data;
a second metadata structure including a same plurality of fields in the first metadata structure, each field having the same field length as in the first metadata structure, wherein both the first and second metadata structures provide metadata on a same block of customer data, wherein metadata from at least one field in the first metadata structure is included in at least one field in the second metadata structure, and wherein metadata that is not included in the first metadata structure is not included in at least one field in the second metadata structure.

45. The computer readable medium of claim 44, wherein not all of the metadata in the first metadata structure is included in the second metadata structure, wherein at least one metadata value capable of being included in the first metadata structure is associated with the second metadata structure, whereby a combination of the metadata included in the second metadata structure and the at least one metadata value associated with the second metadata structure comprises all the metadata included in the first metadata structure and additional metadata not maintained in the first metadata structure.

46. The computer readable medium of claim 44, wherein one field in the second metadata structure includes metadata from one corresponding field in the first metadata structure.

47. The computer readable medium of claim 46, wherein bits in the field in the second metadata structure including data from the corresponding field in the first metadata structure are used to store metadata from at least one other field in the first metadata structure.

48. The computer readable medium of claim 47, further comprising;
an association of metadata values with the second metadata structure for metadata in the first metadata structure not included in the second metadata structure.

49. The computer readable medium of claim 47, wherein if the number of bits needed to store the metadata in the corresponding field in the first metadata structure is less than the length of the field in the second metadata structure storing metadata from the corresponding field in the first metadata structure, then each bit in the field in the second metadata structure not needed to store the metadata from the corresponding field in the first metadata structure is used to store metadata from at least one other field in the first metadata structure.

50. The computer readable medium of claim 44, further comprising:
a third metadata structure including the first metadata structure and including fields in addition to those in the first metadata structure, wherein at least one field in the second metadata structure includes data from the additional fields in the third metadata structure in.

* * * * *